(12) United States Patent
Ogawa et al.

(10) Patent No.: US 8,775,909 B2
(45) Date of Patent: Jul. 8, 2014

(54) TERMINAL APPARATUS AND RESPONSE SIGNAL TRANSMITTING METHOD

(75) Inventors: Yoshihiko Ogawa, Kanagawa (JP); Akihiko Nishio, Kanagawa (JP); Masayuki Hoshino, Kanagawa (JP); Daichi Imamura, Osaka (JP); Seigo Nakao, Kanagawa (JP); Atsushi Sumasu, Kanagawa (JP); Ayako Horiuchi, Kanagawa (JP); Shinsuke Takaoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 13/517,106

(22) PCT Filed: Jan. 5, 2011

(86) PCT No.: PCT/JP2011/000008
§ 371 (c)(1),
(2), (4) Date: Jun. 19, 2012

(87) PCT Pub. No.: WO2011/083755
PCT Pub. Date: Jul. 14, 2011

(65) Prior Publication Data
US 2012/0266054 A1    Oct. 18, 2012

(30) Foreign Application Priority Data
Jan. 6, 2010  (JP) .................................. 2010-001375

(51) Int. Cl.
*H03M 13/00*  (2006.01)
*G06F 11/10*  (2006.01)

(52) U.S. Cl.
USPC ......................................... 714/776; 714/807

(58) Field of Classification Search
CPC combination set(s) only.
See application file for complete search history.

(56) References Cited

U.S. PATENT DOCUMENTS

2010/0262886 A1*  10/2010  Ren ................................ 714/751
2011/0154170 A1*  6/2011  Challa et al. ................... 714/807

OTHER PUBLICATIONS

TS36.212 v8.7.0, 3GPP TSG RAN; Evolved Universal Terrestrial Radio Access(E-UTRA); Multiplexing and channel coding.
TS36.213 v8.8.0, 3GPP TSG RAN; Evolved Universal Terrestrial Radio Access(E-UTRA); Physical Layer Procedure.
Ite, Multiple ACK/NACK for TDD, 3GPP TSG-RAN WG1 #53bis R1-082372, Jun. 20, 2008, entire text.
International Search Report for PCT/JP2011/000008 dated Mar. 22, 2011.

* cited by examiner

*Primary Examiner* — Guerrier Merant
(74) *Attorney, Agent, or Firm* — Pearne & Gordon LLP

(57) ABSTRACT

A terminal apparatus and a response signal transmitting method wherein the system transmission efficiency can be improved by devising a bundling rule. In a terminal (200), a PDSCH receiving unit (208) receives first and second code words, which comprise code word block (CWB) groups to be mapped to the respective ones of a plurality of downstream unit bands, and detects errors of the CWBs; and an A/N bundling unit (216) transmits, based on a bundling rule in which each CWB is associated with any one of first and second bundling groups, a single bundle of response signals into which the error detection results are bundled for each bundling group. According to the bundling rule, at least one of the first and second bundling groups includes both the CWB belonging to the first code words and the CWB belonging to the second code words.

9 Claims, 12 Drawing Sheets

TERMINAL APPARATUS AND RESPONSE SIGNAL TRANSMITTING METHOD

TECHNICAL FIELD

The present invention relates to a terminal apparatus and a response signal transmitting method.

BACKGROUND ART

In time division duplex (TDD) systems concerning 3rd Generation Partnership Project Long Term Evolution (3GPP LTE), when ACK/NACKs (A/Ns) for a plurality of downlink data signals are transmitted through one uplink sub-frame, A/N bundling is used (see FIG. 1). Generally in the LTE, through one downlink sub-frame, a data signal generated using one code word (CW) is transmitted in Non-MIMO transmission, whereas a data signal generated using two CWs is transmitted in MIMO transmission. For these data signals, a terminal generates an A/N for each CW. At this time, in the case of using A/N bundling, the terminal calculates for each CW the logical sum (XOR) of A/Ns of a plurality of sub-frames, to thereby obtain one piece of A/N information (that is, a bundled response signal) for each CW. That is, if even one sub-frame has a NACK in an entire given CW as an A/N bundling target, a NACK is generated as a response signal for the given CW. On the other hand, only if all the sub-frames have an ACK in the entire given CW, an ACK is generated as a response signal for the given CW. That is, focusing on a certain CW, an ACK/NACK is obtained for each sub-frame, and ACK/NACKs are bundled on the basis of the certain CW, whereby one bundled response signal is obtained. Then, the bundled response signal corresponding to each CW is transmitted to a base station (see NPL 1 and NPL 2). The base station performs retransmission control on the basis of the bundled response signal corresponding to each CW. That is, the CW can be regarded here as a unit for retransmitting a data signal. In addition, even in the MIMO transmission mode, a data signal may be generated using one CW. For example, in the case of applying a transmit diversity, a data signal is generated using only one CW.

In addition, before the reception of a downlink data signal, information on resource in which the downlink data signal is to be arranged and the like is reported by a downlink control channel signal (PDCCH) from the base station to the terminal. In order to accurately generate A/N information even if the terminal fails to receive the PDCCH, whether or not a PDCCH for the past sub-frame exists is reported from the base station to the terminal with the use of a downlink assignment indicator (DAI) in the PDCCH. This enables the terminal to determine the number of A/Ns as bundling targets, leading to accurate bundling. In a system not including such a DAI, if the terminal fails to receive the PDCCH, the A/N information cannot be accurately generated in some cases.

In addition, the standardization of 3GPP LTE-Advanced, which achieves a further increase in speed of communication than that of 3GPP LTE, has been started. The 3GPP LTE-Advanced system (hereinafter, may be referred to as "LTE-A system") follows the 3GPP LTE system (hereinafter, may be referred to as "LTE system"). In the 3GPP LTE-Advanced, in order to achieve a downlink transmission rate of 1 Gbps or higher at the maximum, a base station and a terminal that can communicate with each other at a wideband frequency of 40 MHz or higher are expected to be introduced.

In LTE-Advanced downlinks, carrier aggregation using a plurality of downlink unit bands (component carriers (CCs)) for data transmission is supported. In the case of using such a carrier aggregation technique, an A/N for a downlink data signal of each CC is generated. Accordingly, in uplinks, A/Ns for the plurality of CCs need to be transmitted.

CITATION LIST

Non-Patent Literature

NPL 1
TS36.212 v8.7.0, "3GPP TSG RAN; Evolved Universal Terrestrial Radio Access (E-UTRA); Multiplexing and channel coding NPL 2
TS36.213 v8.8.0, "3GPP TSG RAN; Evolved Universal Terrestrial Radio Access (E-UTRA); Physical Layer Procedure

SUMMARY OF INVENTION

Technical Problem

Here, in the case of using the carrier aggregation technique, in order to transmit the A/Ns for the plurality of CCs with a smaller number of bits, it is conceivable to adopt A/N bundling used in LTE systems as described in NFL [1] and NPL [2]. Specifically, a terminal generates an A/N for each CC in each CW, and bundles A/Ns of all CCs for each CW. That is, the terminal generates one bundled response signal for each CW. Then, the bundled response signal is transmitted from the terminal to a base station for each CW.

FIG. 2 shows a control example in which the carrier aggregation technique is combined with the A/N bundling. In FIG. 2, in one sub-frame, three CCs are used for downlink data transmission. Then, three code word blocks constituting a CW are respectively mapped to the three CCs. Accordingly, in a Non-MIMO transmission mode, an A/N is generated for each of the code word blocks of CW #0 that are respectively mapped to the different CCs. Further, the A/N for CW #0 is bundled, and a 1-bit bundled response signal (A/N #0) is generated.

In contrast, in a MIMO transmission mode, similarly to the Non-MIMO transmission mode, three code word blocks constituting CW #0 are respectively mapped to three CCs. In the MIMO transmission mode, further, three code word blocks constituting CW #1 are respectively mapped to three CCs. Then, a terminal generates a bundled response signal for each of CW #0 and CW #1. Here, CW #0 is a CW that always exists in both the Non-MIMO transmission and the MIMO transmission, whereas CW #1 is a CW that does not exist in the Non-MIMO transmission and exists in the MIMO transmission.

As described above, even the simple combination of the carrier aggregation technique and the A/N bundling can reduce the amount of signaling. In addition, if the adoption of the A/N bundling can reduce the bundled response signal to as few as 2 bits in one sub-frame, the terminal can perform QPSK modulation on the bundled response signal to thereby achieve single carrier transmission having low cubic metric (CM) characteristics. As a result, the terminal can transmit the bundled response signal while maintaining high reception quality.

Here, is studied in the LTE-A that a transmission mode is set to a terminal for each CC. Examples of the transmission mode include: a spatial multiplexing MIMO transmission mode; a transmit diversity mode; a beamforming transmission mode; and SIMO transmission mode. It is assumed that two CWs are used in the spatial multiplexing MIMO transmission mode, whereas only one CW (CW #0) is used in the other transmission modes (that is, the Non-MIMO transmission mode). Then, in the case where the transmission mode is different for each CC, the number of A/Ns used for forming each bundled response signal (that is, the number of A/Ns as bundling targets) may be significantly different between the CCs.

For example, in the case where the MIMO transmission mode is used for CC #0 and where the Non-MIMO transmission mode is used for CCs #1 and #2, as shown in FIG. 3, the number of A/Ns as bundling targets (that is, the number of code word blocks of CW #0 mapped for each CC) is 3 for A/N #0 that is a first bundled response signal, and the number of A/Ns as bundling targets (that is, the number of code word blocks of CW #1 mapped for each CC) is 1 for A/N #1 that is a second bundled response signal. Consequently, A/N #0 is more likely to be a NACK after bundling, whereas A/N #1 is less likely to be a NACK after bundling. Accordingly, the CW as a bundling target for A/N #0 has a higher retransmission probability, and the CW as a bundling target for A/N #1 has a lower retransmission probability. As a result, the retransmission efficiency of the entire system is lower compared with the case where the retransmission efficiencies of A/N #0 and A/N #1 are substantially equal to each other.

For example, in the case where the probability of an ACK is 90% and where the probability of a NACK is 10%, in the example shown in FIG. 3, the probability that A/N #0 is a NACK is 27.1% (=(1−0.9*0.9*0.9)*100), and the probability that A/N #1 is a NACK is 10.0%. In contrast, in the case where the number of A/Ns as bundling targets for A/N #0 and the number of A/Ns as bundling targets for A/N #1 are equal to each other, the probability that each of A/N #0 and A/N #1 is a NACK is 19.0% (=(1−0.9*0.9)*100). Accordingly, in the case where the number of A/Ns as bundling targets for A/N #0 and the number of A/Ns as bundling targets for A/N #1 are not equal to each other as shown in FIG. 3, the expected value of the number of code word blocks to be retransmitted is 0.913 (=(3 blocks×27.1%+1 block×10.0%)/100). In contrast, in the case where the number of A/Ns as bundling targets for A/N #0 and the number of A/Ns as bundling targets for A/N #1 are equal to each other, the expected value of the number of code word blocks to be retransmitted is 0.740 (=(2 blocks× 19.0%+2 blocks×19.0%)/100). As described above, in the case where the number of A/Ns as bundling targets for A/N #0 and the number of A/Ns as bundling targets for A/N #1 are not equal to each other, the transmission efficiency degrades. In addition, even in the case where the MIMO transmission mode is set for all CCs, the number of CWs may be different between the CCs depending on propagation channel conditions or the amount of transmission data of each CC. Also in this case, the transmission efficiency degrades similarly to the above.

The present invention has an object to provide a terminal apparatus and a response signal transmitting method that can enhance the system transmission efficiency by devising a bundling rule.

Solution to Problem

A terminal apparatus according to an aspect of the present invention includes: a receiver configured to receive a first code word and a second code word that are each formed of a group of code word blocks mapped to a plurality of downlink unit bands; an error detector configured to detect an error of each code word block; and a transmitter configured to transmit a bundled response signal that is obtained by bundling results of the error detection into one result per each bundling group, on a basis of a bundling rule for associating each code word block with any of a first bundling group and a second bundling group. The bundling rule defines that at least any one of the first bundling group and the second bundling group includes both the code word block belonging to the first code word and the code word block belonging to the second code word.

A response signal transmission method according to an aspect of the present invention includes: receiving a first code word and a second code word that are each formed of a group of code word blocks mapped to a plurality of downlink unit bands; detecting an error of each code word block; and transmitting a bundled response signal that is obtained by bundling results of the error detection into one result per each bundling group, on a basis of a bundling rule for associating each code word block with any of a first bundling group and a second bundling group. The bundling rule defines that at least any one of the first bundling group and the second bundling group includes both the code word block belonging to the first code word and the code word block belonging to the second code word.

Advantageous Effects of Invention

According to the present invention, it is possible to provide a terminal apparatus and a response signal transmitting method that can enhance the system transmission efficiency by devising a bundling rule.

DESCRIPTION OF EMBODIMENTS

Now, embodiments of the present invention will be described in detail with reference to the accompanying drawings. Note that, throughout the embodiments, the same components are denoted by the same reference signs, and redundant description thereof is omitted.

[1] Embodiment 1

[1-1] Outline of Communication System

A communication system including base station 100 and terminal 200 to be described later makes communication using an uplink unit band and a plurality of downlink unit bands associated with the uplink unit band, that is, communication using carrier aggregation.

In addition, communication not using carrier aggregation is also possible between base station 100 and terminal 200 depending on resource allocation to terminal 200 by base station 100.

In addition, in the case where this communication system makes the communication not using carrier aggregation, a conventional ARQ is performed. On the other hand, in the case where this communication system makes the communication using carrier aggregation, a bundling technique is applied to an ARQ. That is, this communication system is, for example, an LTE-A system, base station 100 is, for example, an LTE-A base station, and terminal 200 is, for example, an LTE-A terminal.

Note that description is given below assuming that this communication system is an FDD system for LTE-A, base station 100 is an LTE-A base station, and terminal 200 is an LTE-A terminal. That is, because this communication system is the FDD system for LTE-A, it is assumed that a downlink sub-frame corresponds to an uplink sub-frame on a one-to-one basis and that A/Ns of one downlink sub-frame are transmitted through one uplink sub-frame.

[1-2] Configuration of Base Station

Figure 1:
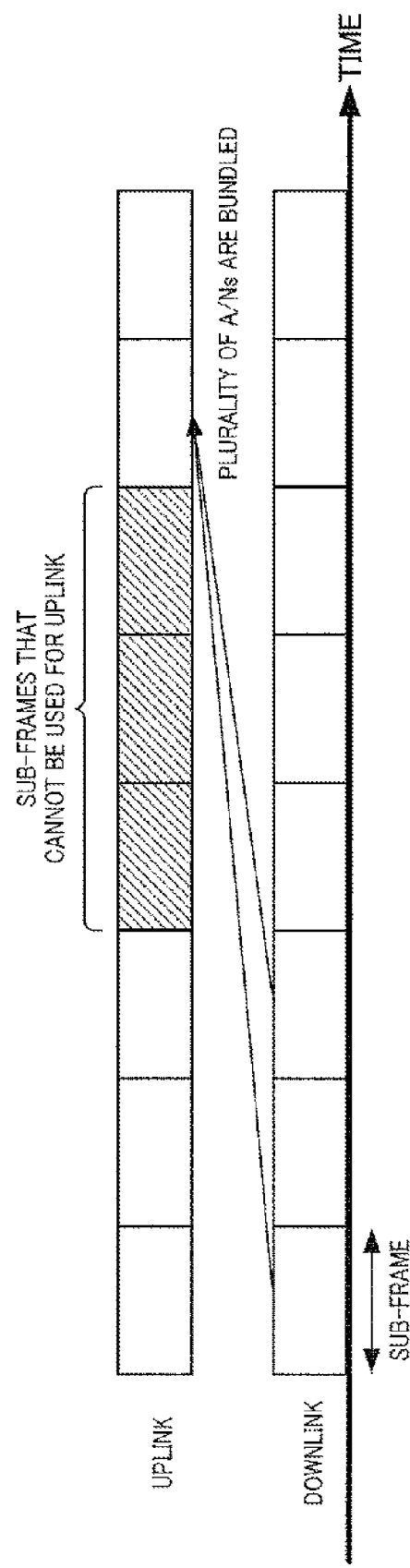
FIG. 1 is a diagram used for describing a conventional bundling technique.
Figure 2:
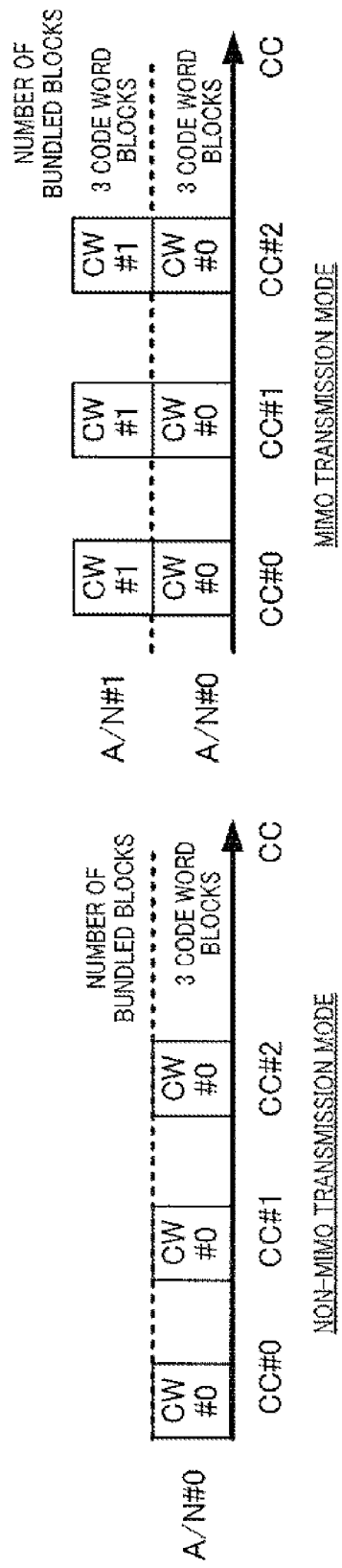
FIG. 2 is a diagram used for describing a control example in which a carrier aggregation technique is combined with the bundling technique.
Figure 3:
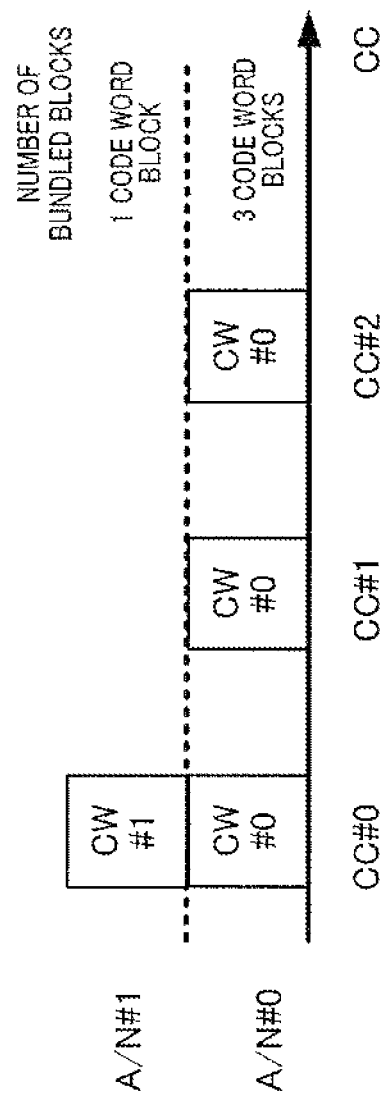
FIG. 3 is a diagram used for describing a control example in which the carrier aggregation technique is combined with the bundling technique.
Figure 4:
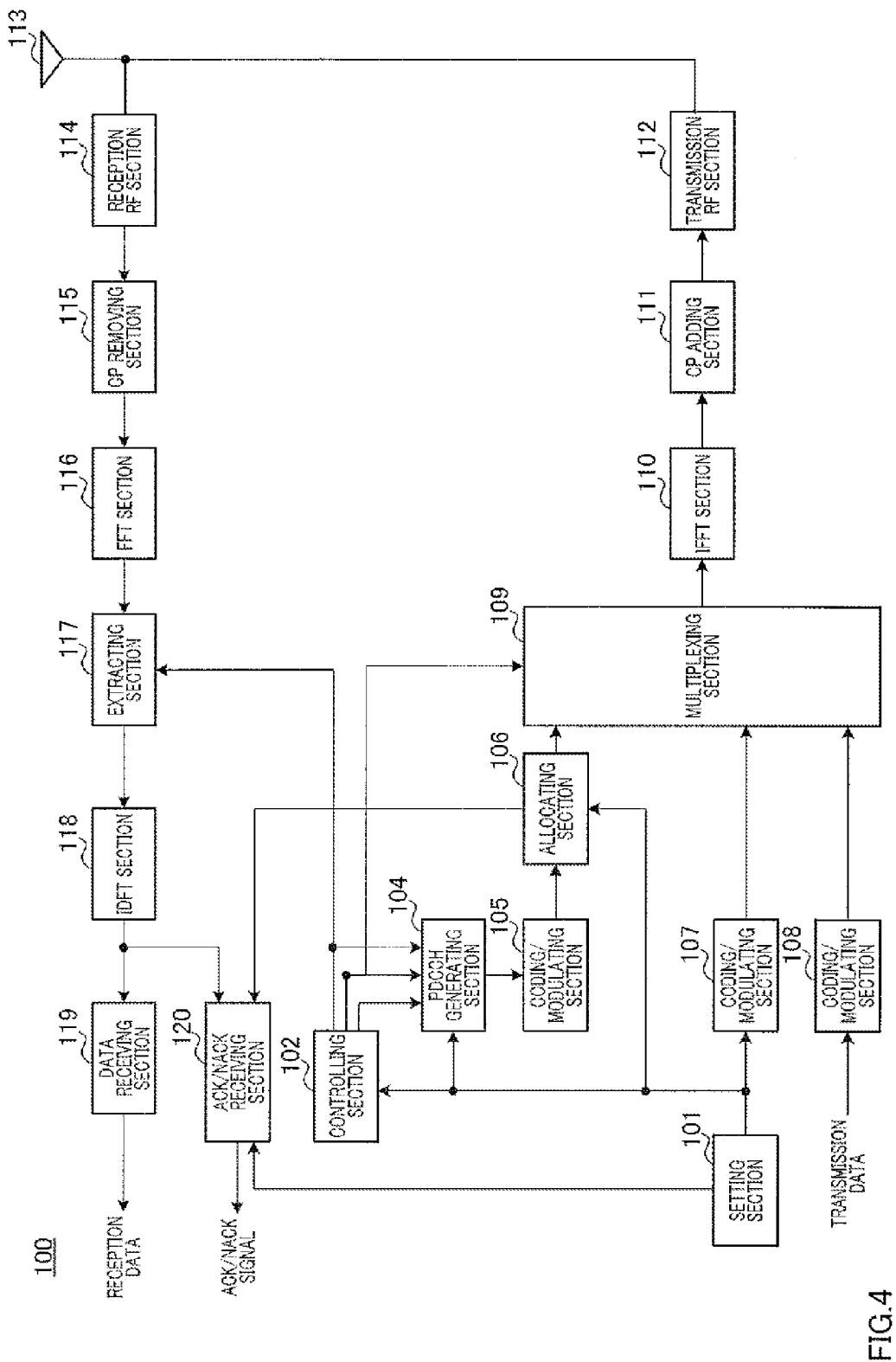
FIG. 4 is a block diagram showing a configuration of a base station according to Embodiment 1 of the present invention.

FIG. 4 is a block diagram showing a configuration of base station 100 according to Embodiment 1 of the present invention. In FIG. 4, base station 100 includes setting section 101, controlling section 102, PDCCH generating section 104, coding/modulating sections 105, 107, and 108, allocating section 106, multiplexing section 109, inverse fast Fourier transform (IFFT) section 110, cyclic prefix (CP) adding section 111, transmission RF section 112, antenna 113, reception RF section 114, CP removing section 115, fast Fourier transform (FFT) section 116, extracting section 117, inverse discrete Fourier transform (IDFT) section 118, data receiving section 119, and ACK/NACK receiving section 120.

Setting section 101 sets an uplink transmission mode and a downlink transmission mode for communication with a setting target terminal on the basis of a user equipment capability (UE Capability) or propagation channel conditions of the setting target. The transmission modes are set on a unit band basis. In addition, in the case where a plurality of setting target terminals exist, the transmission modes are set on a terminal basis.

Examples of the transmission modes include: a transmission mode using transmit diversity, a transmission mode using spatial multiplexing MIMO, a transmission mode using Rank1 precoding, a MU-MIMO transmission mode, and a beamforming transmission mode, which are defined in the LTE; and a "multi-antenna transmission mode" for an LTE-A terminal, which is a transmission mode common to MIMO transmission and CoMP transmission. In addition, examples of the uplink transmission mode include a MIMO transmission mode and a transmission mode using non-contiguous band allocation. Hereinafter, although the present invention is not limited to the following definition, the transmission mode using spatial multiplexing MIMO, the multi-antenna transmission mode, and the MIMO transmission mode are referred to as "MIMO mode", and the transmission mode using transmit diversity, the transmission mode using Rank1 precoding, the MU-MIMO transmission mode, the beamforming transmission mode, and the transmission mode using non-contiguous band allocation are referred to as "Non-MIMO mode."

Setting section 101 outputs setting information containing transmission mode information indicating the transmission mode set to the setting target terminal, to controlling section 102, PDCCH generating section 104, allocating section 106, and coding/modulating section 107.

In addition, setting section 101 sets a method of transmitting a response signal (that is, an A/N) for a downlink data signal (for example, A/N bundling, multi-code transmission, and multi-A/N multiplexing), on the basis of the user equipment capability (UE capability) or the propagation channel conditions of the setting target terminal. Setting section 101 outputs this setting information to ACK/NACK receiving section 120.

Note that the setting information is reported to each terminal via coding/modulating section 107, as control information (RRC information) of an upper layer.

Setting section 101 also sets a control channel element (CCE) to which a PDCCH is to be allocated, to the setting target terminal on a unit band basis. In the case where a plurality of setting target terminals exist, the CCE is set on a terminal basis. Setting section 101 outputs the setting information on the CCE to allocating section 106. Note that each PDCCH occupies resource formed of one CCE or a plurality of contiguous CCEs.

Controlling section 102 generates allocation control information (DCI) in accordance with the transmission mode information contained in the setting information received from setting section 101. The DCI is generated on an allocation target terminal basis.

For a terminal in the Non-MIMO mode, controlling section 102 generates allocation control information containing MCS information, resource (RB) allocation information, and HARQ information for one transport block, in a DCI format 1.

For a terminal in the MIMO mode, controlling section 102 generates allocation control information containing MCS information and the like for two transport blocks, in a DCI format 2.

Here, the allocation control information generated by controlling section 102 contains: uplink allocation control information indicating uplink resource to which uplink data of a terminal is allocated (for example, physical uplink shared channel (PUSCH)); and downlink allocation control information indicating downlink resource to which downlink data to a terminal is allocated (for example, physical downlink shared channel (PDSCH)).

Controlling section 102 can also use allocation control information (DCI 0/1A) common to all terminals, in addition to the above-mentioned allocation control information that is generated in accordance with the transmission mode of each terminal.

During normal data transmission, controlling section 102 generates the allocation control information in a format (DCIs 1, 2, 2A, 2B, 2C, 2D, 0A, and 0B) depending on the transmission mode of each terminal. This enables data transmission in the transmission mode set to each terminal, leading to an enhancement in throughput.

Unfortunately, a reception error may frequently occur in the transmission mode set to each terminal, in case of a sudden change in propagation channel conditions or a change in interference from neighboring cells. In this case, controlling section 102 generates the allocation control information in a format common to all terminals (DCI 0/1A) (that is, generates the allocation control information in the format of a default transmission mode). This enables more robust transmission.

In addition, controlling section 102 generates the allocation control information in a format for common channel (for example, DCIs 1C and 1A), in addition to the terminal-based allocation control information for data allocation. The allocation control information for common channel is used for allocation of data common to a plurality of terminals, such as announcement information and paging information.

Then, of the generated terminal-based allocation control information for data allocation, controlling section 102 outputs the MCS information and the HARQ information to PDCCH generating section 104, outputs the uplink resource allocation information to PDCCH generating section 104 and extracting section 117, and outputs the downlink resource allocation information to PDCCH generating section 104 and multiplexing section 109. Controlling section 102 also outputs the generated allocation control information for common channel to PDCCH generating section 104.

PDCCH generating section 104 generates a PDCCH signal containing the terminal-based allocation control information for data allocation (that is, the uplink resource allocation information, the downlink resource allocation information, the MCS information, the HARQ information, and the like for each terminal) or a PDCCH signal containing the allocation control information for common channel (that is, the announcement information, the paging information, and the like common to the terminals), each allocation control information being inputted by controlling section 102. At this time, PDCCH generating section 104 adds CRC bits to the uplink allocation control information and the downlink allocation control information that are generated on a terminal basis, and subjects the CRC bits to masking (or scrambling) with a terminal ID. Then, PDCCH generating section 104 outputs the PDCCH signal after the masking to coding/modulating section 105.

Coding/modulating section 105 modulates, after channel coding, the PDCCH signal from PDCCH generating section 104, and outputs the PDCCH signal after the modulation to allocating section 106. Here, coding/modulating section 105 sets such a coding rate that enables each terminal to obtain sufficient reception quality, on the basis of channel quality information (channel quality indicator (CQI) information) reported by each terminal. For example, coding/modulating section 105 sets a lower coding rate to a terminal located closer to a cell boundary (a terminal having lower channel quality).

Allocating section 106 receives, from coding/modulating section 105, the PDCCH signal containing the allocation control information for common channel and the PDCCH signal containing the terminal-based allocation control information for data allocation for each terminal. Each PDCCH signal is inputted on a unit band (as a mapping target) basis. Then, allocating section 106 allocates the PDCCH signal to a CCE indicated by the CCE setting information received from setting section 101.

Then, allocating section 106 outputs the PDCCH signal allocated to the CCE to multiplexing section 109 on a unit band basis. Allocating section 106 also outputs information indicating the CCE to which the PDCCH signal is allocated for each unit band, to ACK/NACK receiving section 120.

Coding/modulating section 107 modulates, after channel coding, the setting information from setting section 101, and outputs the setting information after the modulation to multiplexing section 109.

Coding/modulating section 108 receives a transport block for each CC. Then, coding/modulating section 108 maps the received transport block for each CC to a code word for each CC, and performs channel coding and modulation. That is, CRC is added for the code word of each CC (hereinafter, referred to as code word block). This enables error detection on the receiving side for each code word block. Coding/modulating section 108 outputs the code word thus obtained after the modulation (that is, a data signal), to multiplexing section 109.

Specifically, in the case of processing data for a terminal in the MIMO mode, coding/modulating section 108 receives two transport blocks, as input and maps the received two transport blocks to two CWs. Then, similarly to the above, coding/modulating section 108 performs channel coding and modulation on each CW. Note that, as described above, even in the MIMO mode, only one CW may be used for data for a terminal having poor reception quality or a terminal having a small amount of data.

In contrast, in the case of processing data for a terminal in the Non-MIMO mode, coding/modulating section 108 receives one transport block as input, and maps the received one transport block to one CW. Then, similarly to the above, coding/modulating section 108 performs channel coding and modulation on the CW.

Multiplexing section 109 multiplexes, for each unit band, the PDCCH signal from allocating section 106, the setting information from coding/modulating section 107, and the data signal (that is, the PDSCH signal) from coding/modulating section 108. Here, multiplexing section 109 maps the PDCCH signal and the data signal (PDSCH signal) to each unit band, on the basis of the downlink resource allocation information from controlling section 102. Note that multiplexing section 109 may map the setting information to the PDSCH.

In addition, multiplexing section 109 multiplexes the data signal for MIMO transmission between layers (a virtual channel in a space).

Then, multiplexing section 109 outputs the multiplexed signal to IFFT section 110.

IFFT section 110 converts the multiplexed signal received from multiplexing section 109 into a temporal waveform, and CP adding section 111 adds a CP to the temporal waveform to thereby obtain an OFDM.

Transmission RF section 112 subjects the OFDM signal received from CP adding section 111 to transmission radio processing (up-conversion, digital to analog (D/A) conversion, and the like), and transmits the resultant signal via antenna 113. Here, for convenience sake, only one antenna 113 is illustrated in FIG. 4, but base station 100 actually includes a plurality of antennas 113.

Meanwhile, reception RF section 114 subjects a reception radio signal that is received in a reception band via antenna 113, to reception radio processing (down-conversion, analog to digital (A/D) conversion, and the like), and outputs the obtained reception signal to CP removing section 115.

CP removing section 115 removes a CP from the reception signal, and FFT section 116 converts the reception signal after the CP removal into a frequency domain signal.

Extracting section 117 extracts uplink data from the frequency domain signal received from FFT section 116, on the basis of the uplink resource allocation information from controlling section 102, and IDFT section 118 converts the extracted signal into a time domain signal and outputs the time domain signal to data receiving section 119 and ACK/NACK receiving section 120.

Data receiving section 119 decodes the time domain signal inputted by IDFT section 118. Then, data receiving section 119 outputs the uplink data after the decoding as the reception data.

Of the time domain signal received from IDFT section 118, ACK/NACK receiving section 120 extracts an ACK/NACK signal (that is, a response signal) from each terminal for the downlink data (PDSCH signal). Specifically, ACK/NACK receiving section 120 extracts the response signal from the uplink control channel (for example, a physical uplink control channel (PUCCH)) or the uplink data channel (for example, a physical uplink shared channel (PUSCH)), on the basis of the CCE information received from allocating section 106 and the information on the method of transmitting an A/N received from setting section 101. In addition, the uplink control channel is an uplink control channel associated with the CCE allocated to the downlink data.

Note that the reason why the PUCCH is associated with the CCE is to eliminate the need for signaling for reporting the PUCCH that is used by each terminal for transmitting a response signal, from the base station to each terminal. As a result, downlink communication resource can be efficiently used. In accordance with such association, each terminal determines a PUCCH used for transmitting an ACK/NACK signal on the basis of the CCE to which the control information (PDCCH signal) on its own terminal is mapped. In addition, the resource for transmitting the ACK/NACK signal transmitted through the PUSCH is determined in advance depending on the number of A/N bits and the like.

Then, ACK/NACK receiving section 120 makes ACK/NACK determination of the extracted response signal. This response signal is a bundled response signal or a response signal that is not bundled.

Then, when receiving a bundled response signal that is a bundling target and is transmitted by terminal 200, ACK/NACK receiving section 120 makes ACK/NACK determination of an entire group of code word blocks that are associated with the bundled response signal according to a predetermined correspondence relation. For example, in the case where a first bundled response signal (A/N #0) is a NACK, ACK/NACK receiving section 120 determines that all code word blocks corresponding to the first bundled response signal (A/N #0) are a NACK. On the other hand, in the case where the first bundled response signal (A/N #0) is an ACK, ACK/NACK receiving section 120 determines that all code word blocks corresponding to the first bundled response signal (A/N #0) are an ACK. As a result, the entire group of code word blocks associated with the bundled response signal that is a NACK is retransmitted. Note that the correspondence relation between a bundled response signal and a group of code word blocks will be described in detail later.

[1-3] Configuration of Terminal

Figure 5:
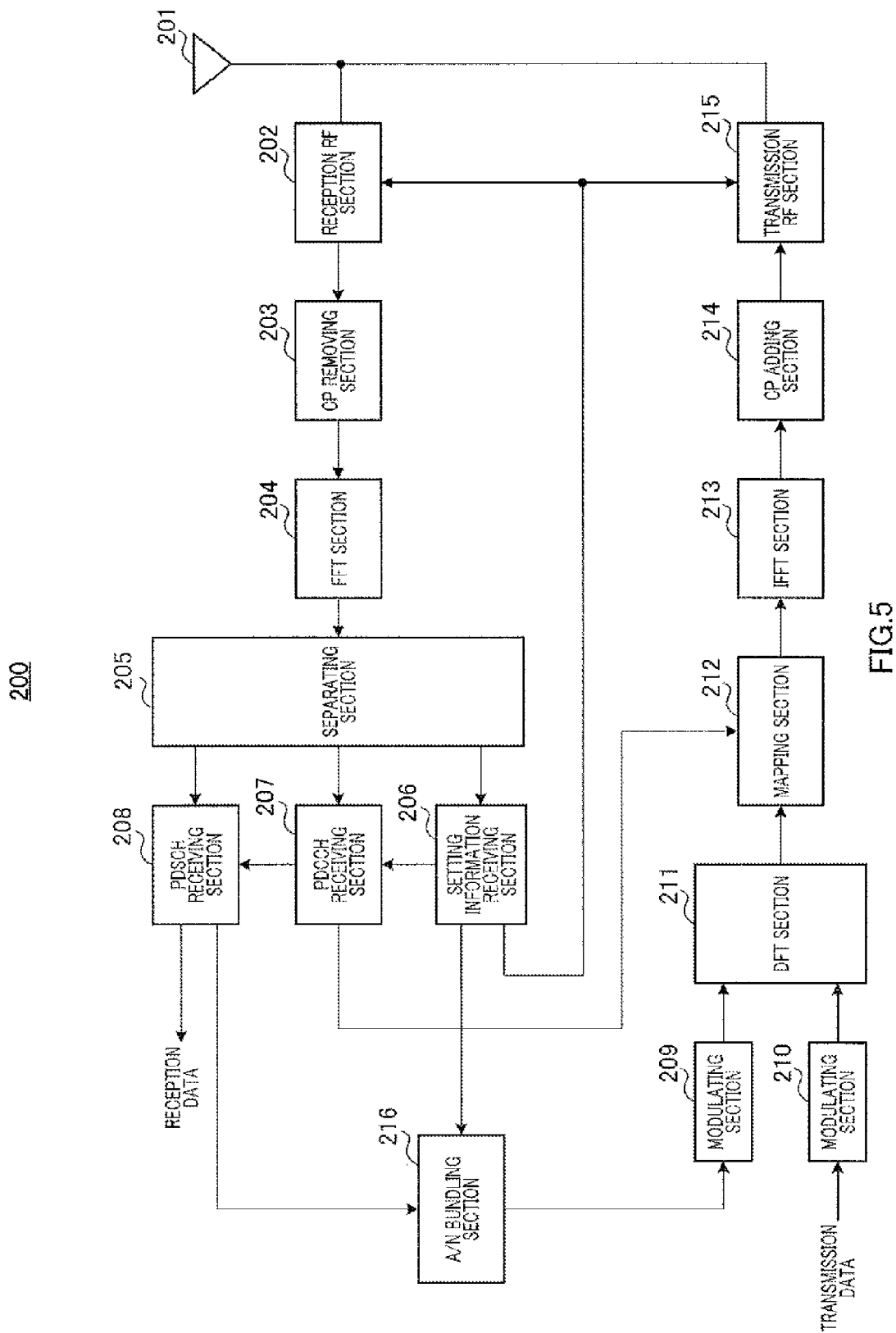
FIG. 5 is a block diagram showing a configuration of a terminal according to Embodiment 1 of the present invention.

FIG. 5 is a block diagram showing a configuration of terminal 200 according to Embodiment 1 of the present invention. Here, terminal 200 is an LTE-A terminal, receives a data signal (downlink data), and transmits an ACK/NACK signal for the data signal to base station 100 through a PUCCH.

In FIG. 5, terminal 200 includes antenna 201, reception RF section 202, CP removing section 203, FFT section 204, separating section 205, setting information receiving section 206, PDCCH receiving section 207, PDSCH receiving section 208, modulating sections 209 and 210, DFT section 211, mapping section 212, IFFT section 213, CP adding section 214, transmission RF section 215, and A/N bundling section 216.

Reception RF section 202 sets a reception band on the basis of band information received from setting information receiving section 206. Reception RF section 202 subjects a radio signal (here, an OFDM signal) that is received in the reception band via antenna 201, to reception radio processing (down-conversion, analog to digital (A/D) conversion, and the like), and outputs the obtained reception signal to CP removing section 203. Note that the reception signal contains a PDSCH signal, a PDCCH signal, and control information of an upper layer containing setting information.

CP removing section 203 removes a CP from the reception signal, and FFT section 204 converts the reception signal after the CP removal into a frequency domain signal. FFT section 204 outputs the frequency domain signal to separating section 205.

Separating section 205 separates the signal received from FFT section 204 into the control signal (for example, RRC signaling) of the upper layer containing the setting information, the PDCCH signal, and the data signal (that is, the PDSCH signal). Then, separating section 205 outputs the control signal to setting information receiving section 206, outputs the PDCCH signal to PDCCH receiving section 207, and outputs the PDSCH signal to PDSCH receiving section 208.

Setting information receiving section 206 reads information indicating a terminal ID set to its own terminal, from the control signal received from separating section 205, and outputs the read information as terminal ID information to PDCCH receiving section 207. Setting information receiving section 206 also reads information indicating a transmission mode set to its own terminal, and outputs the read information as transmission mode information to PDCCH receiving section 207. Setting information receiving section 206 also reads information indicating an A/N transmitting method set to its own terminal, and outputs the read information as bundling presence/absence information to A/N bundling section 216.

PDCCH receiving section 207 performs blind-decoding (monitoring) on the PDCCH signal inputted by separating section 205, to thereby obtain a PDCCH signal for its own terminal. Here, PDCCH receiving section 207 performs the blind-decoding for each of the DCI formats, the DCI format for data allocation common to all terminals (for example, DCI 0/1A), the DCI format depending on the transmission mode set to its own terminal (for example, DCIs 1, 2, 2A, 2C, 2D, 0A, and 0B), and the DCI format for common channel allocation common to all terminals (for example, DCIs 1C and 1A). As a result, PDCCH receiving section 207 obtains the PDCCH signal containing allocation control information on each DCI format.

Then, PDCCH receiving section 207 outputs downlink resource allocation information to PDSCH receiving section 208, and outputs uplink resource allocation information to mapping section 212, the downlink resource allocation information contained in the PDCCH signal for its own terminal.

PDCCH receiving section 207 also outputs the CCE number of a CCE (with CRC=OK) in which a PDCCH signal for its own terminal is detected (outputs the CCE number of the first CCE, if the CCE connection number is more than one), to mapping section 212.

PDSCH receiving section 208 extracts, for each unit band, reception data (downlink data) from the PDSCH signal inputted by separating section 205, on the basis of the downlink resource allocation information inputted by PDCCH receiving section 207. That is, PDSCH receiving section 208 extracts each code word block from the PDSCH signal inputted by separating section 205.

In addition, PDSCH receiving section 208 performs error detection on each extracted code word block.

Then, as a result of the error detection, in the case where the code word block has an error, PDSCH receiving section 208 generates a NACK. On the other hand, in the case where the code word block does not have an error, PDSCH receiving section 208 generates an ACK. PDSCH receiving section 208 outputs ACK/NACK information on each code word block to A/N bundling section 216.

Here, in a unit band in which the MIMO mode is set to its own terminal, the error detection is performed on one code word block or each of code word blocks of two CWs. Whether one code word block is mapped or two code word blocks having different CWs are mapped in a given, unit band is designated from base station 100 to terminal 200 by means of the downlink resource allocation information. In addition, in a unit band in which the Non-MIMO mode is set to its own terminal, ACK/NACK information on one code word block (or a transport block) is generated.

A/N bundling section 216 generates a response signal from the ACK/NACK information received from PDSCH receiving section 208, on the basis of the information indicating the A/N transmitting method, the information being inputted by setting information receiving section 206.

Specifically, when bundling is reported as the A/N transmitting method, A/N bundling section 216 bundles the ACK/NACK information according to a bundling rule, to thereby generate a bundled response signal. That is, a group of code word blocks constituting each bundling group is determined in the bundling rule. Here, a code word block is defined by the combination of a CC identification number and a CW identification number. The bundling rule corresponds to the correspondence relation between the bundled response signal and the group of code word blocks.

A/N bundling section 216 outputs the response signal thus generated to modulating section 209.

Modulating section 209 modulates the response signal received from PDSCH receiving section 208, and outputs the response signal after the modulation to DFT section 211.

Modulating section 210 modulates the transmission data (uplink data), and outputs the data signal after the modulation to OFT section 211.

DFT section 211 converts the response signal received from modulating section 209 and the data signal received from modulating section 210 into a frequency domain, and outputs the plurality of obtained frequency components to mapping section 212.

Mapping section 212 maps frequency components corresponding to the data signal, of the plurality of frequency components received from DFT section 211, to the PUSCH arranged in the uplink unit band in accordance with the uplink resource allocation information received from PDCCH receiving section 207. Mapping section 212 also maps frequency components corresponding to the response signal, of the plurality of frequency components received from DFT section 211, to the PUCCH arranged in the uplink unit band in accordance with the CCE number received from PDCCH receiving section 207.

Note that description is given here of the case where a set of modulating section 209, modulating section 210, DFT section 211, and mapping section 212 is provided, but the set of these sections may be provided on a unit band basis.

IFFT section 213 converts the plurality of frequency components mapped to the PUSCH, into a time domain waveform, and CP adding section 214 adds a CP to the time domain waveform.

Transmission RF section 215 can change a transmission band, and sets the transmission band on the basis of band information received from setting information receiving section 206. Then, transmission RF section 215 subjects the signal to which the CP is added, to transmission radio processing (up-conversion, digital to analog (D/A) conversion, and the like), and transmits the resultant signal via antenna 201.

[1-4] Operations of Base Station 100 and Terminal 200

Operations of base station 100 and terminal 200 having the above-mentioned configurations are described.

Description is given below of the correspondence relation between a bundled response signal and a group of code word blocks, which is used by ACK/NACK receiving section 120 of base station 100, and the bundling rule, which is used by A/N bundling section 216 of terminal 200. Because the bundling rule corresponds to the correspondence relation between a bundled response signal and a group of code word blocks, the bundling rule is described below.

[1-4-1] Bundling Rule 1

Figure 6:
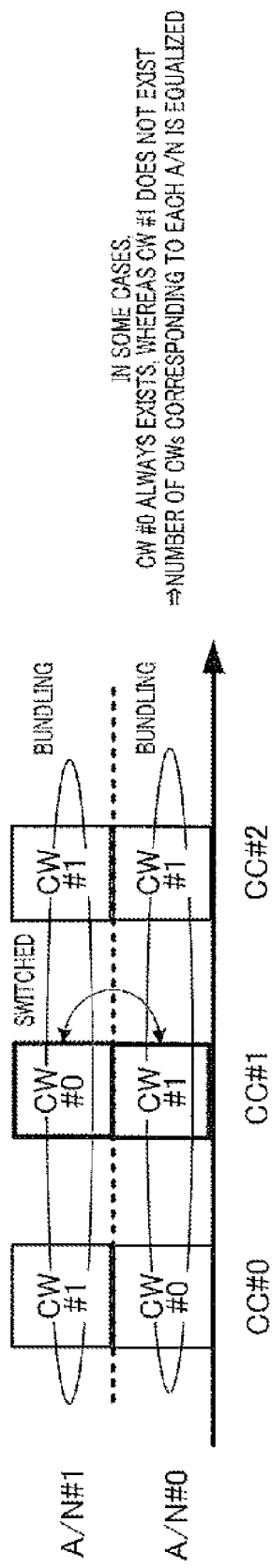
FIG. 6 is a diagram used for describing bundling rule 1.

FIG. 6 is a diagram used for describing bundling rule 1. FIG. 6 illustrates: a first bundling group used for forming a first bundled response signal (A/N #0); and a second bundling group used for forming a second bundled response signal. Specifically, the first bundling group is formed of: a code word block of CW #0 mapped to CC #0; a code word block of CW #1 mapped to CC #1; and a code word block of CW #0 mapped to a CC #2. Meanwhile, the second bundling group is formed of: a code word block of CW #1 mapped to CC #0; a code word block of CW #0 mapped to CC #1; and a code word block of CW #1 mapped to CC #2. That is, both bundling groups include the code word block of CW #0 and the code word block of CW #1. In other words, the correspondence relation in part of a plurality of CCs between: a bundling group; and a CW to which each code word block constituting the bundling group belongs is opposite to the correspondence relation in the other CC(s).

More specifically, the correspondence relation between: a bundling group in the CCs; and a CW to which each code word block constituting the bundling group belongs is switched in accordance with the CC number. For example, in FIG. 6, the correspondence relation in the even-numbered CCs is same as the conventional relation, whereas the correspondence relation in the odd-numbered CC is different from the conventional relation. Note that the correspondence relation in the CCs between: a bundling group; and a CW to which each code word block constituting the bundling group belongs can be formulated in the following manner. The A/N number in the following formula refers to the identification number of each bundling group. The number of A/Ns is 2 in FIG. 6, and corresponds to two types of A/N #0 and A/N #1.

$A/N$ number=$(CW$ number+$CC$ number)MOD(the number of $A/Ns$)

Note that, in order to prevent a CC that is not used for transmitting a code word block from affecting the A/N bundling, an A/N corresponding to the CC is bundled as an ACK, or is excluded from the bundling. In addition, description is given here assuming that the number of bundling groups is 2, but the number of bundling groups may be 3 or more. The same applies to the bundling rules to be described below.

With the use of such a bundling rule as described above, the number of code word blocks constituting one bundling group is made more equal to the number of code word blocks constituting another bundling group, and hence the system transmission efficiency can be enhanced.

[1-4-2] Bundling Rule 2

Figure 7:
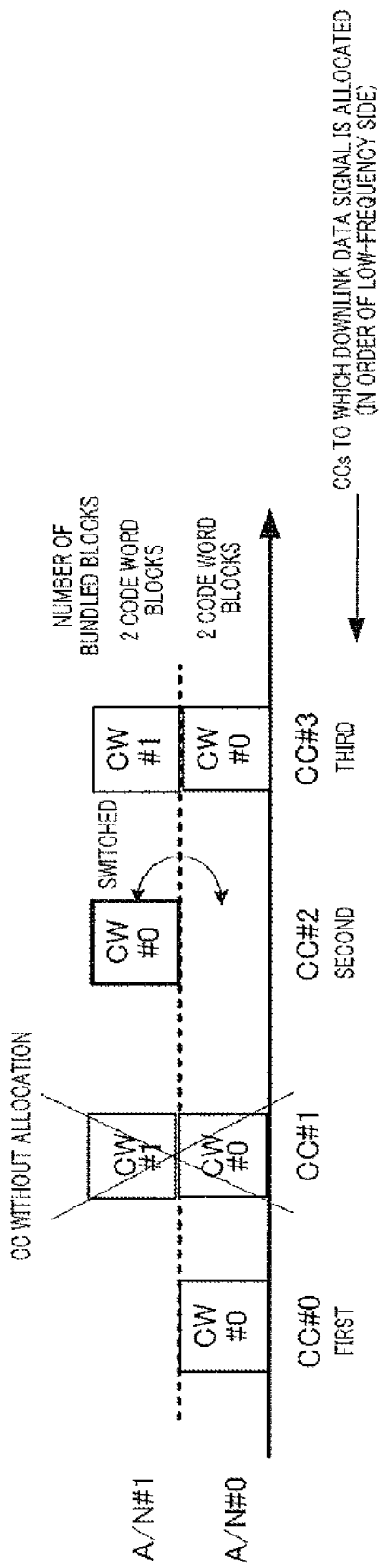
FIG. 7 is a diagram used for describing bundling rule 2.

FIG. 7 is a diagram used for describing a bundling rule 2. Similarly to FIG. 6, FIG. 7 also illustrates: a first bundling group used for forming a first bundled response signal (A/N #0); and a second bundling group used for forming a second bundled response signal. Note that, according to the bundling rule 2, numbers are reassigned to a group of CCs to which code word block(s) are actually mapped, and the correspondence relation between: a bundling group in the CCs; and a CW to which each code word block constituting the bundling group belongs is switched in accordance with the number after such renumbering.

For example, in FIG. 7, in the case where CCs to which a downlink data signal is allocated are numbered with 1, 2, and 3 in order of the low-frequency side, the correspondence relation in the odd-numbered CCs is same as the conventional relation, whereas the correspondence relation in the even-numbered CC is different from the conventional relation. Specifically, the first bundling group is formed of: a code word block of CW #0 mapped to $CC1^{st}$ position (CC #0); and a code word block of CW #0 mapped to $CC3^{rd}$ position (CC #3). Meanwhile, the second bundling group is formed of: a code word block of CW #0 mapped to a $CC2^{nd}$ position (CC #2); and a code word block of CW #1 mapped to the $CC3^{rd}$ position (CC #3). Note that the correspondence relation in the CCs between: a bundling group; and a CW to which each code word block constituting the bundling group belongs can be formulated in the following manner. The A/N number in the following formula refers to the identification number of each bundling group.

$$A/N \text{ number}=(CW \text{ number}+(\text{number of } CC \text{ with allocation}-1))\text{MOD}(\text{the number of } A/Ns)$$

With the use of such a bundling rule as described above, the number of code word blocks constituting one bundling group can be made more equal to the number of code word blocks constituting another bundling group, regardless of whether or not code word block(s) are actually mapped.

[1-4-3] Bundling Rule 3

Figure 8:
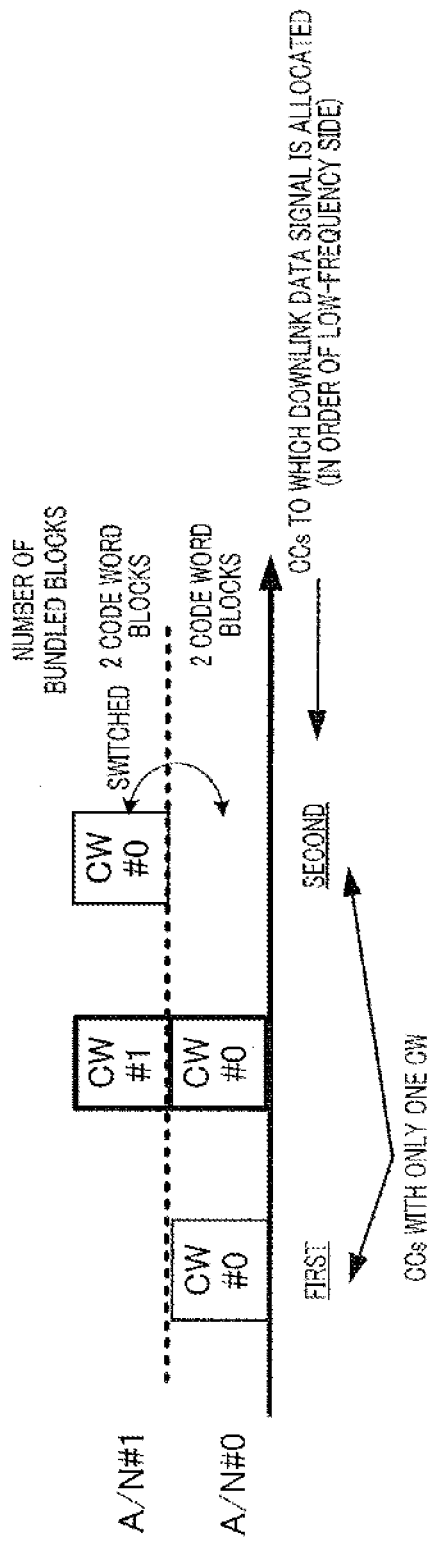
FIG. 8 is a diagram used for describing bundling rule 3.

FIG. 8 is a diagram used for describing bundling rule 3. Similarly to FIG. 6, FIG. 8 also illustrates: a first bundling group used for forming a first bundled response signal (A/N #0); and a second bundling group used for forming a second bundled response signal. Note that, according to bundling rule 3, numbers are reassigned to a group of CCs to which only one code word block is actually mapped, and the correspondence relation between: a bundling group in the CCs; and a CW to which each code word block constituting the bundling group belongs is switched in accordance with the number after such renumbering.

For example, in FIG. 8, in the case where CCs to which only one code word block is mapped are numbered with 1 and 2 in order of the low-frequency side, the correspondence relation in the first CC is same as the conventional relation, whereas the correspondence relation in the second CC is different from the conventional relation. The correspondence relation in the CC to which a plurality of code word blocks are mapped is same as the conventional relation. Note that the correspondence relation in the CCs between: a bundling group; and a CW to which each code word block constituting the bundling group belongs can be formulated in the following manner. The A/N number in the following formula refers to the identification number of each bundling group.

$$A/N \text{ number}=(CW \text{ number}+CC \text{ number to which only one } CW \text{ is allocated})\text{MOD}(\text{the number of } A/Ns)$$

[2] Embodiment 2

Embodiment 2 assumes a TDD system for LTE-A. That is, it is assumed that a plurality of downlink sub-frames correspond to an uplink sub-frame on a multiple-to-one basis and that A/Ns of the plurality of downlink sub-frames are transmitted through one uplink sub-frame.

[2-1] Configurations of Base Station and Terminal

Basic configurations of a base station and a terminal according to Embodiment 2 are the same as those of base station 100 and terminal 200 according to Embodiment 1, and thus are described with reference to FIG. 4 and FIG. 5.

ACK/NACK receiving section 120 of base station 100 according to Embodiment 2 has basically the same function as that of Embodiment 1, except that one bundled response signal relates to downlink data transmitted through a plurality of sub-frames. Note that the correspondence relation between a bundled response signal and a group of code word blocks will be described in detail later.

A/N bundling section 216 of terminal 200 according to Embodiment 2 has basically the same function as that of Embodiment 1. That is, when bundling is reported as the A/N transmitting method, A/N bundling section 216 bundles the ACK/NACK information according to a bundling rule, to thereby generate a bundled response signal. Note that Embodiment 2 is different from Embodiment 1 in that one bundled response signal relates to downlink data transmitted through a plurality of sub-frames. That is, here, a code word block is defined by the combination of a sub-frame number, a CC identification number, and a CW identification number.

[2-2] Operations

Operations of base station 100 and terminal 200 having the above-mentioned configurations are described.

[2-2-1] Bundling Rule 4

Figure 9:
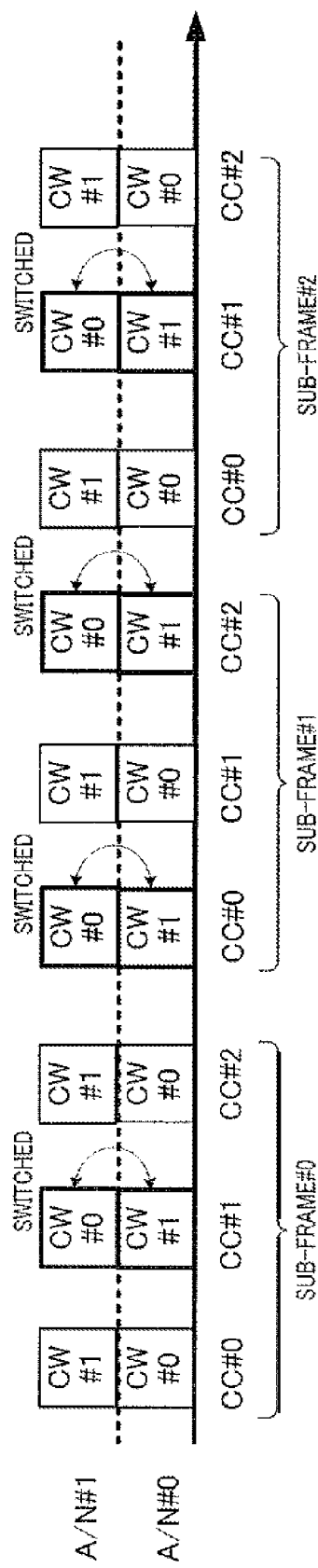
FIG. 9 is a diagram used for describing bundling rule 4 according to Embodiment 2 of the present invention.

FIG. 9 is a diagram used for describing bundling rule 4. Similarly to FIG. 6, FIG. 9 also illustrates: a first bundling group used for forming a first bundled response signal (A/N #0); and a second bundling group used for forming a second bundled response signal. Note that, according to bundling rule 4, the correspondence relation between: a bundling group; and a CW to which each code word block constituting the bundling group belongs is switched in accordance with the combination of a sub-frame number and a CC number.

For example, in FIG. 9, when CCs are arranged in order of the CC number and the sub-frame number, the correspondence relation in the odd-numbered CCs is same as the conventional relation, whereas the correspondence relation in the even-numbered CCs is different from the conventional relation. Here, considering the bundling rule on a sub-frame basis, the correspondence relation between: a bundling group in the CCs; and a CW to which each code word block constituting the bundling group belongs is the same between sub-frames #0 and #2, and is opposite to the correspondence relation in the sub-frame #1. That is, the correspondence relation between: a bundling group; and a CW to which each code word block constituting the bundling group belongs is switched in accordance with the sub-frame number. Note that the correspondence relation in the CCs between: a bundling group; and a CW to which each code word block constituting the bundling group belongs can be formulated in the following manner. The A/N number in the following formula refers to the identification number of each bundling group.

$$A/N\ number = (CW\ number + CC\ number + sub\text{-}frame\ number) \text{MOD}(the\ number\ of\ A/Ns)$$

With the use of such a bundling rule as described above, the number of code word blocks constituting one bundling group is made more equal to the number of code word blocks constituting another bundling group, and hence the system transmission efficiency can be enhanced. Description is given here assuming that the number of bundling groups is 2, but the number of bundling groups may be 3 or more.

Note that, in FIG. 9, the correspondence relation is the same between sub-frames #0 and #2, but the correspondence relation may be different among all sub-frames #0, #1, and #2. For example, assuming that three code words are used, the correspondence relation between: a bundling group; and a CW to which each code word block constituting the bundling group belongs may be determined in the following manner. In sub-frame #0, code word blocks of CWs #0, #1, and #2 are respectively associated with first to third bundling groups. In addition, in sub-frame #1, code word blocks of CWs #1, #2, and #0 are respectively associated with the first to third bundling groups. In addition, in sub-frame #2, code word blocks of CWs #2, #0, and #1 are respectively associated with the first to third bundling groups. Even with such a bundling rule as described above, the number of code word blocks constituting one bundling group is made more equal to the number of code word blocks constituting another bundling group in the plurality of sub-frames as a whole, and hence the system transmission efficiency can be enhanced.

In addition, in FIG. 9, the correspondence relation is switched between neighboring CCs in a given sub-frame. Alternatively, a CC interval at which the correspondence relation is switched may be changed in each sub-frame. For example, in sub-frame #0, CWs #0 and #1 are always associated with first and second bundling groups regardless of the CC number. In addition, in sub-frame #1, the correspondence relation in the CCs between: a bundling group; and a CW to which each code word block constituting the bundling group belongs is switched at a one-CC interval (that is, between neighboring CCs). In addition, in sub-frame #2, the correspondence relation in the CCs between: a bundling group; and a CW to which each code word block constituting the bundling group belongs is switched at a two-CC interval. Even with such a bundling rule as described above, the number of code word blocks constituting one bundling group is made more equal to the number of code word blocks constituting another bundling group in the plurality of sub-frames as a whole, and hence the system transmission efficiency can be enhanced.

[2-2-2] Bundling Rule 5

Figure 10:
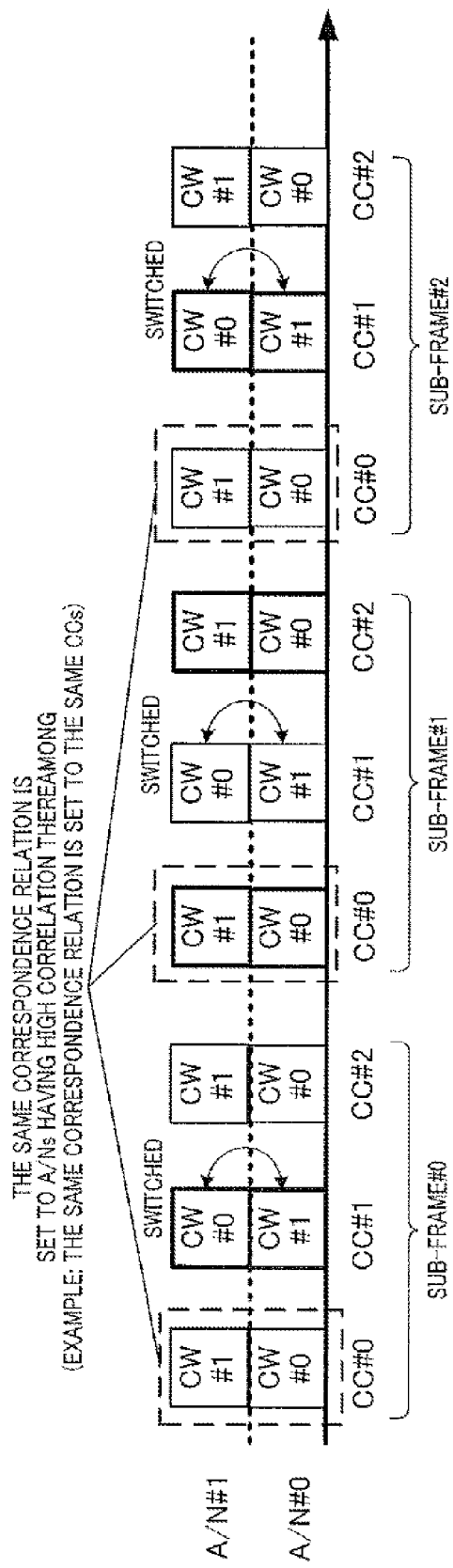
FIG. 10 is a diagram used for describing bundling rule 5.

FIG. 10 is a diagram used for describing bundling rule 5. In FIG. 10, the correspondence relation between: a bundling group in CCs having the same CC number; and a CW to which each code word block constituting the bundling group belongs is the same regardless of the sub-frame. That is, the correspondence relation between: a bundling group; and a CW to which each code word block constituting the bundling group belongs is the same among all sub-frames. In addition, focusing on one sub-frame, similarly to the bundling rule 1, the correspondence relation between: a bundling group in the CCs; and a CW to which each code word block constituting the bundling group belongs is switched in accordance with the CC number.

Here, the used bands may be 800 MHz and 3 GHz. That is, a plurality of CCs having carrier frequencies separated from each other may be used. In such a case, propagation environments (or inter-cell interference) are completely different among the CCs. Consequently, the correlation on an A/N between the CCs (that is, the correlation of a data decoding error) is lower than the correlation thereon between the sub-frames. Accordingly, in bundling rule 5, the correspondence relation between: a bundling group in the CCs having the same CC number; and a CW to which each code word block constituting the bundling group belongs is set to be the same, regardless of the sub-frame. Note that the correspondence relation between: a bundling group; and a CW to which each code word block constituting the bundling group belongs can be formulated in the following manner. The A/N number in the following formula refers to the identification number of each bundling group. In addition, description is given here assuming that the number of bundling groups is 2, but the number of bundling groups may be 3 or more.

$$A/N\ number = (CW\ number + CC\ number) \text{MOD}(the\ number\ of\ A/Ns)$$

[2-2-3] Bundling Rule 6

Figure 11:
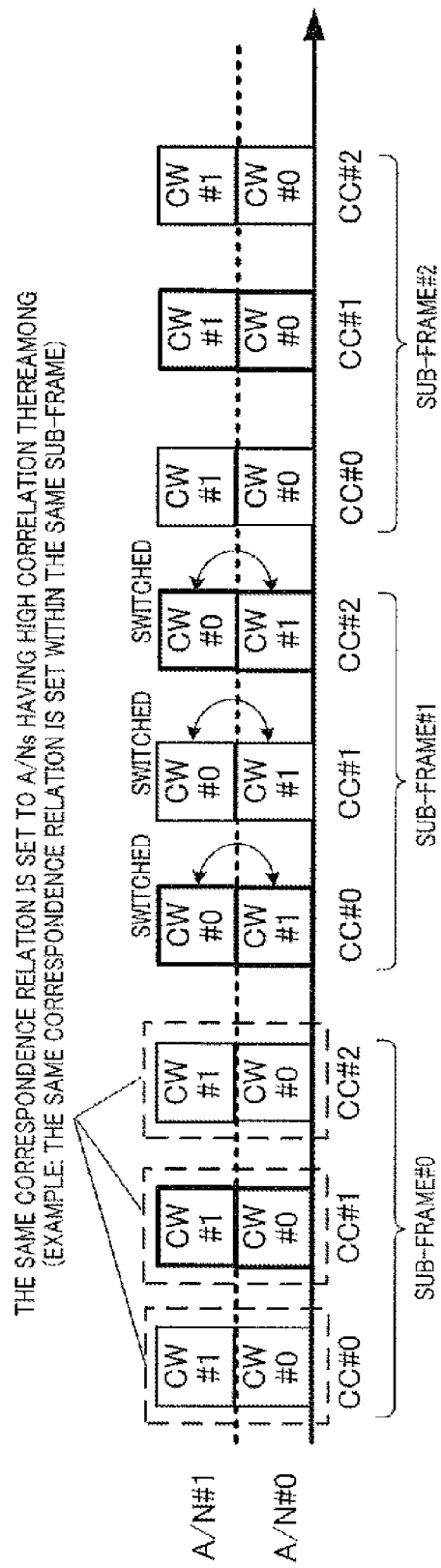
FIG. 11 is a diagram used for describing bundling rule 6.

FIG. 11 is a diagram used for describing a bundling rule 6. In FIG. 11, the correspondence relation between: a bundling group; and a CW to which each code word block constituting the bundling group belongs is the same within the same sub-frame, regardless of the CC number. In addition, the correspondence relation between: a bundling group; and a CW to which each code word block constituting the bundling group belongs is switched between sub-frames.

Here, in the case where a plurality of sub-frames that are subjected to the bundling rule are temporally separated from one another or in the case where a plurality of CCs that are subjected to the bundling rule are close to one another in the frequency domain, the correlation on an A/N between the CCs is higher than the correlation thereon between the sub-frames. Accordingly, in bundling rule 6, the correspondence relation between: a bundling group; and a CW to which each code word block constituting the bundling group belongs is set to be the same within the same sub-frame, regardless of the CC number. Note that the correspondence relation between: a bundling group; and a CW to which each code word block constituting the bundling group belongs can be formulated in the following manner. The A/N number in the following formula refers to the identification number of each bundling group. In addition, description is given here assuming that the number of bundling groups is 2, but the number of bundling groups may be 3 or more.

$$A/N\ number = (CW\ number + sub\text{-}frame\ number) \text{MOD}(the\ number\ of\ A/Ns)$$

[3] Embodiment 3

Embodiment 3 relates to a bundling rule for the Non-MIMO mode. Basic configurations of a base station and a terminal according to Embodiment 3 are the same as those of base station 100 and terminal 200 according to Embodiment 1, and thus are described with reference to FIG. 4 and FIG. 5.

Figure 12:
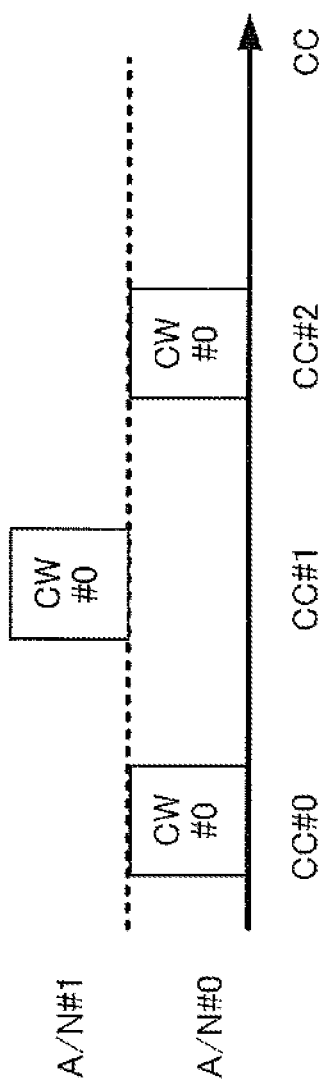
FIG. 12 is a diagram used for describing bundling rule 7 according to Embodiment 3 of the present invention.

FIG. 12 is a diagram used for describing a bundling rule 7. Here, communication in the Non-MIMO mode is made between base station 100 and terminal 200. That is, communication using only one code word is made between base station 100 and terminal 200.

FIG. 12 illustrates: a first bundling group used for forming a first bundled response signal (A/N #0); and a second bundling group used for forming a second bundled response signal. Specifically, the first bundling group is formed of: a code word block mapped to CC #0; and a code word block mapped to CC #2. Meanwhile, the second bundling group is formed of a code word block mapped to CC #1. That is, a bundling group associated with part of the plurality of CCs is different from a bundling group associated with the other CC(s).

More specifically, the correspondence relation between a CC and a bundling group is switched in accordance with the CC number. In FIG. 12, the even-numbered CCs are associated with the first bundling group, whereas the odd-numbered CC is associated with the second bundling group.

With the use of such a bundling rule as described above, even in the case of the Non-MIMO mode, the number of code word blocks constituting each bundling group can be made smaller, while the number of code word blocks constituting one bundling group can be made more equal to the number of code word blocks constituting another bundling group. Hence, the system transmission efficiency can be enhanced.

In addition, in the case where all the CCs are in the Non-MIMO mode, one A/N normally exists for each CC. Hence, in order to make the number of CCs (the number of CWs) as bundling targets substantially equal among all the bundling groups, the base station needs to determine the combination of CCs to be bundled and report the determined combination to the terminal. For example, CC #0 and CC #1 are bundled, whereby the first bundled response signal (A/N #0) is generated. Further, an A/N of CC #2 is defined as the second bundled response signal (A/N #1). In such a case, if bundling rule 7 is combined with bundling rules 1 to 6, bundling control is possible using one rule, regardless of the Non-MIMO mode or the MIMO mode, even in the case where the Non-MIMO mode and the MIMO mode are mixedly set to a plurality of CCs.

[4] Other Embodiments (1) The MIMO mode and the Non-MIMO mode may be distinctively set in the following manner. Specifically, transmission modes 3 and 4 (that is, transmission modes in which transmission of two CWs is supported) that are defined in the LTE may be set as the MIMO mode, and the other transmission modes (that is, transmission modes in which only one CW is transmitted) may be set as the Non-MIMO mode.

(2) The above description is given mainly of the case where the number of bundling groups is 2, but the present invention is not limited thereto, and the number of bundling groups may be 3 or more. In addition, in the above description, two bundled response signals are subjected to QPSK modulation to be transmitted, but may be transmitted independently of each other.

(3) In the above embodiments, description is given of the correspondence relation between: a bundling group; and a CW to which each code word block constituting the bundling group belongs, but the present invention is not limited thereto. The correspondence relation between a bundling group and a transport block (TB) or the correspondence relation between a bundling group and a layer may be determined. Here, TBs are mapped to CWs, that is, TB #0 and TB #1 are mapped to CW #0 and CW #1. At this time, TB #0 and TB #1 may be respectively associated with CW #0 and CW #1, or TB #0 and TB #1 may be respectively associated with CW #1, and CW #0. In addition, the layer refers to a spatial channel through which each CW is transmitted. Accordingly, CW #0 and CW #1 may be respectively allocated to layer #0 and layer #1, and CW #0 and CW #1 may be respectively allocated to layer #1 and layer #0. Further, the correspondence relation between a CW and a layer may be switched between slots.

In the case where the number of CWs is limited to 1 for each CC, whether to transmit CW #0 or CW #1 may be switched for each CC.

In addition, the correspondence relation between a bundling group and an antenna may be switched.

(4) In addition, the correspondence relation between: a bundling group; and a CW to which each code word block constituting the bundling group belongs may be defined according to the following CCs.

Firstly, the correspondence relation between: a bundling group; and a CW to which each code word block constituting the bundling group belongs may be switched among CCs determined by the system. That is, in the case where the system uses five CCs, the correspondence relation between a code word and an antenna is defined among the five CCs, regardless of whether or not resource is allocated to a target CC. That is, the correspondence relation between a code word and an antenna is switched among the five CCs.

Secondly, the correspondence relation between: a bundling group; and a CW to which each code word block constituting the bundling group belongs may be defined among CCs to which downlink data set for each terminal is likely to be allocated. In the LTE-A, a group of CCs to which downlink data set for each terminal is likely to be allocated is referred to as UE DL component carrier set.

Thirdly, the correspondence relation between: a bundling group; and a CW to which each code word block constituting the bundling group belongs may be defined among CCs activated for each terminal.

Fourthly, the correspondence relation between: a bundling group; and a CW to which each code word block constituting the bundling group belongs may be defined among CCs to which downlink data is allocated in a PDCCH.

(5) In the case where a plurality of carrier frequencies (for example, 800 MHz and 3 GHz) are used, A/N bundling may be performed for each carrier frequency. If the carrier frequencies are different, propagation environments (or inter-cell interference) are completely different, and hence A/Ns thereof are bundled into different groups, whereby the retransmission efficiency can be enhanced.

(6) A bundling group may be different between CCs (anchor carriers) that transmit important information and CCs (which are not an anchor carrier) that transmit low-priority information. With this configuration, A/N bundling can be performed independently on the anchor carriers that transmit the important information, and hence the transmission accuracy of the important information can be enhanced.

(7) The correspondence relation between: a bundling group; and a CW to which each code word block constituting the bundling group belongs is defined above, but may be replaced with the correspondence relation between a bundling group and a sub-frame or a CC. For example, a bundling group of A/N #0 may be associated with all CWs of CC #0 and CC #2 in sub-frame #0 and with all CWs of CC #1 in sub-frame #1. Then, a bundling group of an A/N #1 may be associated with all CWs of CC #0 and CC #2 in sub-frame #1 and with all CWs of CC #1 in sub-frame #0. With this configuration, even in the case where data is transmitted by only given CCs, it can be switched to the bundling group of A/N #0 or the bundling group of A/N #1 in accordance with the sub-frame, and hence a balance between the bundling groups can be more maintained. As a result, it is possible to provide a terminal apparatus and a response signal transmitting method that can enhance the system transmission efficiency.

(8) Note that the above-mentioned embodiments are described assuming the antenna, but the present invention can be similarly applied to an antenna port.

The antenna port refers to a logical antenna including one or more physical antennas. That is, the antenna port does not necessarily refer to one physical antenna, and may refer to an array antenna including a plurality of antennas.

For example, in 3GPP LTE, how many physical antennas constitute an antenna port is not defined, and a base station is defined as the minimum unit that can transmit different reference signals.

In addition, the antenna port may be defined as the minimum unit for multiplication of weighting of a precoding vector.

In addition, a component carrier (CC) may be defined by a physical cell number and a carrier frequency number, and may be referred to as cell.

(9) In the above-mentioned embodiments, description is given of an example case where the present invention is configured in the form of hardware, but the present invention can be implemented in the form of software.

In addition, the respective functional blocks used in the above-mentioned embodiments are implemented typically as LSI as an integrated circuit. These functional blocks may be individually implemented on a chip, or may be partially or wholly implemented on a chip. The term LSI is used here, but the term IC, system LSI, super LSI, or ultra LSI may be suitably used depending on the degree of integration.

In addition, a technique of making an integrated circuit is not limited to LSI, and such integration may be implemented using a dedicated circuit or a general-purpose processor. It is also possible to utilize: a field programmable gate array (FPGA) that can be programmed after LSI production; and a reconfigurable processor in which connection and settings of circuit cells inside of LSI can be reconfigured.

Moreover, if a technique of making an integrated circuit that can replace LSI appears along with progress in semiconductor technology or other related technology, as a matter of course, the functional blocks may be integrated using the technique. For example, application of biotechnology is possible.

The disclosure of Japanese Patent Application No. 2010-001375, filed on Jan. 6, 2010, including the specification, drawings and abstract, is incorporated herein by reference in its entirety.

INDUSTRIAL APPLICABILITY

The terminal apparatus and the response signal transmitting method of the present invention are suitably used to enhance the system transmission efficiency by devising a bundling rule.

REFERENCE SIGNS LIST

100 Base station
101 Setting section
102 Controlling section
104 PDCCH generating section
105, 107, 108 Coding/modulating section
106 Allocating section
109 Multiplexing section
110, 213 IFFT section
111, 214 CP adding section
112, 215 Transmission RF section
113, 201 Antenna
114, 202 Reception RF section
115, 203 CP removing section
116, 204 FFT section
117 Extracting section
118 IDFT section
119 Data receiving section
120 ACK/NACK receiving section
200 Terminal
205 Separating section
206 Setting information receiving section
207 PDCCH receiving section
208 PDSCH receiving section
209, 210 Modulating section
211 DFT section
212 Mapping section
216 A/N bundling section

The invention claimed is:

1. A terminal apparatus comprising:
a receiver configured to receive a first code word and a second code word, each of the first code word and the second code word being a unit for retransmitting a data signal and being formed of a group of first blocks and a group of second blocks, respectively, the first blocks and the second blocks being mapped to a plurality of downlink unit bands;
an error detector configured to detect an error of each block; and
a transmitter configured to transmit a bundled response signal that is obtained by bundling results of the error detection into one result per each bundling group, on a basis of a bundling rule for associating each block of the first blocks and the second blocks with any of a first bundling group and a second bundling group, wherein
the bundling rule defines that at least any one of the first bundling group and the second bundling group includes both at least one of the first blocks and at least one of the second blocks.

2. The terminal apparatus according to claim 1, wherein the bundling rule defines that a correspondence relation between: the block belonging to the first code word and the block belonging to the second code word in a given downlink unit band; and the first bundling group and the second bundling group, is switched in accordance with an identification number of the given downlink unit band.

3. The terminal apparatus according to claim 2, wherein the identification number defines an identification number that are renumbered in a group of downlink unit bands to which a block is actually mapped.

4. The terminal apparatus according to claim 1, wherein the receiver receives the first code word and the second code word across a plurality of sub-frames,
the transmitter transmits the bundled response signal for the entire first code word and the entire second code word received through the plurality of sub-frames, and
the bundling rule defines that a correspondence relation between: the block belonging to the first code word and the block belonging to the second code word; and the first bundling group and the second bundling group, is switched in accordance with a combination of an identification number of a downlink unit band and an identification number of a sub-frame.

5. The terminal apparatus according to claim 1, wherein
the receiver receives the first code word and the second code word across a plurality of sub-frames,
the transmitter transmits the bundled response signal for the entire first code word and the entire second code word received through the plurality of sub-frames, and
the bundling rule defines that a correspondence relation between: the block belonging to the first code word and the block belonging to the second code word; and the first bundling group and the second bundling group, is switched in accordance with an identification number of a downlink unit band.

6. The terminal apparatus according to claim 1, wherein
the receiver receives the first code word and the second code word across a plurality of sub-frames,
the transmitter transmits the bundled response signal for the entire first code word and the entire second code word received through the plurality of sub-frames, and
the bundling rule defines that a correspondence relation between: the block belonging to the first code word and the block belonging to the second code word; and the first bundling group and the second bundling group, is switched in accordance with an identification number of a sub-frame.

7. A terminal apparatus comprising:
a receiver configured to receive a code word, the code word being a unit for retransmitting a data signal and being formed of a group of blocks, the blocks being mapped to a plurality of downlink unit bands;
an error detector configured to detect an error of each block; and
a transmitter configured to transmit a bundled response signal that is obtained by bundling results of the error detection into one result per each bundling group on a basis of a bundling rule for associating each block with any of a first bundling group and a second bundling group, wherein
the bundling rule defines that a part of the group of blocks is associated with the first bundling group and that a rest other than the part of the group of blocks is associated with the second bundling group.

8. A response signal transmission method comprising:
receiving a first code word and a second code word, each of the first code word and the second code word being a unit for retransmitting a data signal and being formed of a group of first blocks and a group of second blocks, respectively, the first blocks and the second blocks being mapped to a plurality of downlink unit bands;
detecting an error of each block; and
transmitting a bundled response signal that is obtained by bundling results of the error detection into one result per each bundling group, on a basis of a bundling rule for associating each block of the first blocks and the second blocks with any of a first bundling group and a second bundling group, wherein
the bundling rule defines that at least any one of the first bundling group and the second bundling group includes both at least one of the first blocks and at least one of the second blocks.

9. A response signal transmission method comprising:
receiving a code word, the code word being a unit for retransmitting a data signal and being formed of a group of blocks, the blocks being mapped to a plurality of downlink unit bands;
detecting an error of each block; and
transmitting a bundled response signal that is obtained by bundling results of the error detection into one result per each bundling group, on a basis of a bundling rule for associating each block with any of a first bundling group and a second bundling group, wherein
the bundling rule defines that a part of the group of blocks is associated with the first bundling group and that a rest other than the part of the group of blocks is associated with the second bundling group.

* * * * *